(12) United States Patent
Barbir et al.

(10) Patent No.: US 6,994,929 B2
(45) Date of Patent: Feb. 7, 2006

(54) ELECTROCHEMICAL HYDROGEN COMPRESSOR FOR ELECTROCHEMICAL CELL SYSTEM AND METHOD FOR CONTROLLING

(75) Inventors: Frano Barbir, Rocky Hill, CT (US); Bhaskar Balasubramanian, Houston, TX (US); Matt Stone, Rocky Hill, CT (US)

(73) Assignee: Proton Energy Systems, Inc., Wallingford, CT (US)

(*) Notice: Subject to any disclaimer, the term of this patent is extended or adjusted under 35 U.S.C. 154(b) by 415 days.

(21) Appl. No.: 10/248,470

(22) Filed: Jan. 22, 2003

(65) Prior Publication Data

US 2004/0142215 A1 Jul. 22, 2004

(51) Int. Cl.
*H01M 8/04* (2006.01)
*C25B 1/02* (2006.01)
*C25B 9/00* (2006.01)

(52) U.S. Cl. .................. 429/17; 205/637; 204/277; 204/278

(58) Field of Classification Search ............... 429/12, 429/13, 17; 204/277, 278; 205/637
See application file for complete search history.

(56) References Cited

U.S. PATENT DOCUMENTS

| | | | |
|---|---|---|---|
| 3,616,334 A | 10/1971 | Aker et al. .................. 204/129 |
| 3,839,091 A * | 10/1974 | Bloomfield et al. ........... 429/9 |
| 4,302,217 A | 11/1981 | Teitel ..................... 48/180 C |
| 4,360,569 A | 11/1982 | Steyert et al. .............. 428/566 |
| 4,402,187 A | 9/1983 | Golben et al. ................. 62/48 |
| 4,505,120 A | 3/1985 | Golben ......................... 62/48 |
| 4,599,867 A | 7/1986 | Retallick ...................... 62/48 |
| 4,988,580 A | 1/1991 | Ohsaki et al. ................ 429/19 |
| 4,995,235 A | 2/1991 | Halene ...................... 62/46.2 |
| 5,527,632 A | 6/1996 | Gardner ....................... 429/27 |
| 5,678,410 A | 10/1997 | Fujita et al. .................... 62/7 |
| 5,888,355 A | 3/1999 | Mikitenko et al. ..... 203/DIG. 6 |
| 5,900,031 A | 5/1999 | Bloomfield ............... 48/197 R |
| 5,900,330 A | 5/1999 | Kagatani ..................... 429/17 |
| 6,068,673 A | 5/2000 | Bloomfield ............... 48/197 R |
| 6,361,896 B1 | 3/2002 | Eberle et al. ................. 429/40 |
| 6,475,268 B2 | 11/2002 | Thornton ...................... 96/11 |

FOREIGN PATENT DOCUMENTS

| | | | |
|---|---|---|---|
| JP | 09-266006 | * | 10/1997 |
| WO | WO 03/021006 A1 | | 3/2003 |

OTHER PUBLICATIONS

Rohland et al. "Electrochemical Hydrogen Compressor", electrochimica Acta; vol. 43, No. 24, pp. 3841-3846 (1998) .*

(Continued)

*Primary Examiner*—Patrick Joseph Ryan
*Assistant Examiner*—Thomas H. Parsons
(74) *Attorney, Agent, or Firm*—Cantor Colburn LLP

(57) ABSTRACT

In one embodiment, an electrochemical cell system comprises: a fuel cell stack comprising a fuel cell having a fuel cell hydrogen inlet and a fuel cell hydrogen outlet, and a first electrochemical hydrogen compressor in fluid communication with the fuel cell hydrogen outlet, wherein the first electrochemical hydrogen compressor comprises electrodes in electrical communication with an electricity source, and a compressed hydrogen outlet in fluid communication with the fuel cell hydrogen inlet. In one embodiment, the method of operating the electrochemical cell system comprises: introducing hydrogen feed to a fuel cell at a feed rate of greater than stoichiometry, directing excess hydrogen from the fuel cell to a first electrochemical hydrogen compressor, electrochemically compressing the excess hydrogen to compressed hydrogen, and recirculating the compressed hydrogen gas to the fuel cell.

15 Claims, 7 Drawing Sheets

OTHER PUBLICATIONS

Rohland et al. "Electrochemical Hydrogen Compressor" Electrochimica Acta; vol. 43, No. 24, pp. 3841-3846 (1998).

Sedlak et al., "Hydrogen Recovery and Purification Using the Solid Polymer Electrolyte Electrolysis Cell" Int. J. Hydrogen Energy, vol. 6, pp 45-51 May 13, 1980.

Stobel et al., "The Compression of Hydrogen in an Electrochemical Cell Based on a PE Fuel Cell Design" Journal of Power Sources 105 (2002) 208-215.

* cited by examiner

Voltage   0   0.70   1.40   2.10   2.045   2.745   3.445   4.145   4.09

Voltage    0    0.70    1.40    2.10    2.80    3.50    4.20    4.145    4.09

ELECTROCHEMICAL HYDROGEN COMPRESSOR FOR ELECTROCHEMICAL CELL SYSTEM AND METHOD FOR CONTROLLING

BACKGROUND

This disclosure relates to electrochemical cells, and, more particularly, to an electrochemical hydrogen compressor for recirculating an amount of hydrogen gas above the stoichiometric feed ratio through a fuel cell.

Electrochemical cells are energy conversion devices, usually classified as either electrolysis cells or fuel cells. Proton exchange membrane electrolysis cells can function as fuel cells by electrochemically reacting hydrogen with oxygen to generate electricity and as hydrogen generators by electrolytically decomposing water to produce hydrogen and oxygen gases. Referring to FIG. 1, a section of a proton exchange membrane fuel cell is shown generally at 10 and is hereinafter referred to as "cell 10." In cell 10, hydrogen gas 12 and reactant water 14 are introduced to a hydrogen electrode (anode) 16, while oxygen gas 18 is introduced to an oxygen electrode (cathode) 20. Hydrogen gas 12 for fuel cell operation can originate from a hydrocarbon, natural gas, or any other hydrogen source. Hydrogen gas 12 electrochemically reacts at anode 16 to produce hydrogen ions (protons) and electrons such that the electrons flow from anode 16 through an electrically connected external load 24 and such that the protons migrate through a membrane 22 to cathode 20. At cathode 20, the protons and electrons react with the oxygen gas to form water, which additionally includes any reactant water 14 that migrates through membrane 22 to cathode 20. The electrical potential across anode 16 and cathode 20 can be exploited to power external load 24.

A similar configuration as is depicted in FIG. 1 for a fuel cell is often used for electrolysis cells. In an anode feed water electrolysis cell (not shown), reactant water is fed to a cell at an oxygen electrode (anode) to form oxygen gas, electrons, and hydrogen ions (protons). The electrolytic reaction is facilitated by the positive terminal of a power source electrically connected to the anode and the negative terminal of the power source connected to a hydrogen electrode (cathode). The oxygen gas and a first portion of the water are discharged from the cell, while protons and a second portion of the water migrate across a proton exchange membrane to the cathode where hydrogen gas is formed. In a cathode feed electrolysis cell (not shown), water is fed at the hydrogen electrode, and a portion of the water migrates from the cathode across the membrane to the anode where protons and oxygen gas are formed. A portion of the water is discharged from the cell at the cathode side without passing through the membrane. The protons migrate across the membrane to the cathode where hydrogen gas is formed.

An electrochemical cell system (either a fuel cell system or an electrolysis cell system) includes one or more individual cells arranged in a stack with the working fluid directed through the cells via input and output conduits formed within the stack structure. The cells within the stack are sequentially arranged in ionic communication, each including a cathode, a proton exchange membrane, and an anode. In certain arrangements, the anode, cathode, or both are gas diffusion electrodes that facilitate gas diffusion to the membrane. Each cathode/membrane/anode assembly (hereinafter "membrane electrode assembly," or "MEA") may be supported on one or both sides by flow fields that may comprise screen packs and/or bipolar plates. Such flow fields facilitate fluid movement and membrane hydration and provide mechanical support for the MEA. Because a differential pressure often exists in the cells, compression pads or other compression means are often employed to maintain uniform compression in the cell active area, i.e., the electrodes, thereby maintaining intimate contact between flow fields and cell electrodes over long time periods.

While existing electrochemical cell systems are suitable for their intended purposes, there still remains a need for improvements. Some of the improvements needed include the use of devices that provide for the recirculation of hydrogen gas through a fuel cell in order to stabilize or eliminate the decay of the fuel cell while limiting the complexity of the system and maintaining the system reliability.

BRIEF SUMMARY

Disclosed herein are electrochemical cell systems, electrochemical hydrogen compressors, and methods of using the same. In one embodiment, an electrochemical cell system comprises: a fuel cell stack comprising a fuel cell having a fuel cell hydrogen inlet and a fuel cell hydrogen outlet, and a first electrochemical hydrogen compressor in fluid communication with the fuel cell hydrogen outlet, wherein the first electrochemical hydrogen compressor comprises electrodes in electrical communication with an electricity source, and a compressed hydrogen outlet in fluid communication with the fuel cell hydrogen inlet.

In another embodiment, the electrochemical cell system comprises: a fuel cell stack comprising a fuel cell having a fuel cell hydrogen inlet and a fuel cell hydrogen outlet, a reformer having a fuel inlet and a hydrogen and byproduct outlet, an electrochemical hydrogen compressor comprises electrodes in electrical communication with an electricity source and a compressed hydrogen outlet in fluid communication with the fuel cell hydrogen inlet, wherein the electrochemical hydrogen compressor is fluidly disposed between the fuel cell stack and the reformer, in fluid communication with the hydrogen and byproduct outlet and the fuel cell hydrogen inlet, and a fuel cell in fluid communication with the hydrogen electrode.

In one embodiment, the method of operating the electrochemical cell system comprises: introducing hydrogen feed to a fuel cell at a feed rate of greater than stoichiometry, directing excess hydrogen from the fuel cell to a first electrochemical hydrogen compressor, electrochemically compressing the excess hydrogen to compressed hydrogen, and recirculating the compressed hydrogen gas to the fuel cell.

In another embodiment, the method of operating the electrochemical cell system, comprises: reforming a fuel to produce reformate comprising hydrogen and byproducts, introducing the reformate to an electrochemical hydrogen compressor, separating the hydrogen from the byproducts in the electrochemical compressor, and introducing the separated hydrogen to a fuel cell.

The above described and other features are exemplified by the following figures and detailed description.

BRIEF DESCRIPTION OF THE DRAWINGS

Referring now to the drawings, which are meant to be exemplary and not limiting, and wherein like elements are numbered alike in the several Figures.

DETAILED DESCRIPTION

Disclosed herein is an electrochemically-operable hydrogen compressor for an electrochemical cell. The compressor effectively functions as a hydrogen pump and provides for the recirculation of unconsumed hydrogen exhausted from the cell back to the cell stack inlet. While the discussion below is directed to an electrochemical cell comprising a fuel cell, however, it should be understood that electrochemical cells that comprise regenerative fuel cells are also within the scope hereof.

The fuel cell stack comprises a plurality of individual fuel cells that preferably include flow field support structures disposed in the flow fields at opposing sides of a membrane electrode assembly (MEA) defined by a membrane and electrodes. The electrodes provide reactive sites for the dissociation of hydrogen gas into protons and electrons and the subsequent combination of the protons and the electrons with oxygen to form water. The hydrogen gas fed to the fuel cell may be received from any hydrogen source including, but not limited to, a hydrocarbon, natural gas, or the like. At least one of the electrodes may comprise a porous catalytic structure that structurally supports the cell components. The flow field support structures may be screen packs, bipolar plates, porous members, and/or similar structures that are disposed within the flow fields such that the MEA is sufficiently supported. Alternately, the flow field support structures may comprise screen packs, bipolar plates, and/or porous membranes having an electrode incorporated directly therein.

Figure 1:
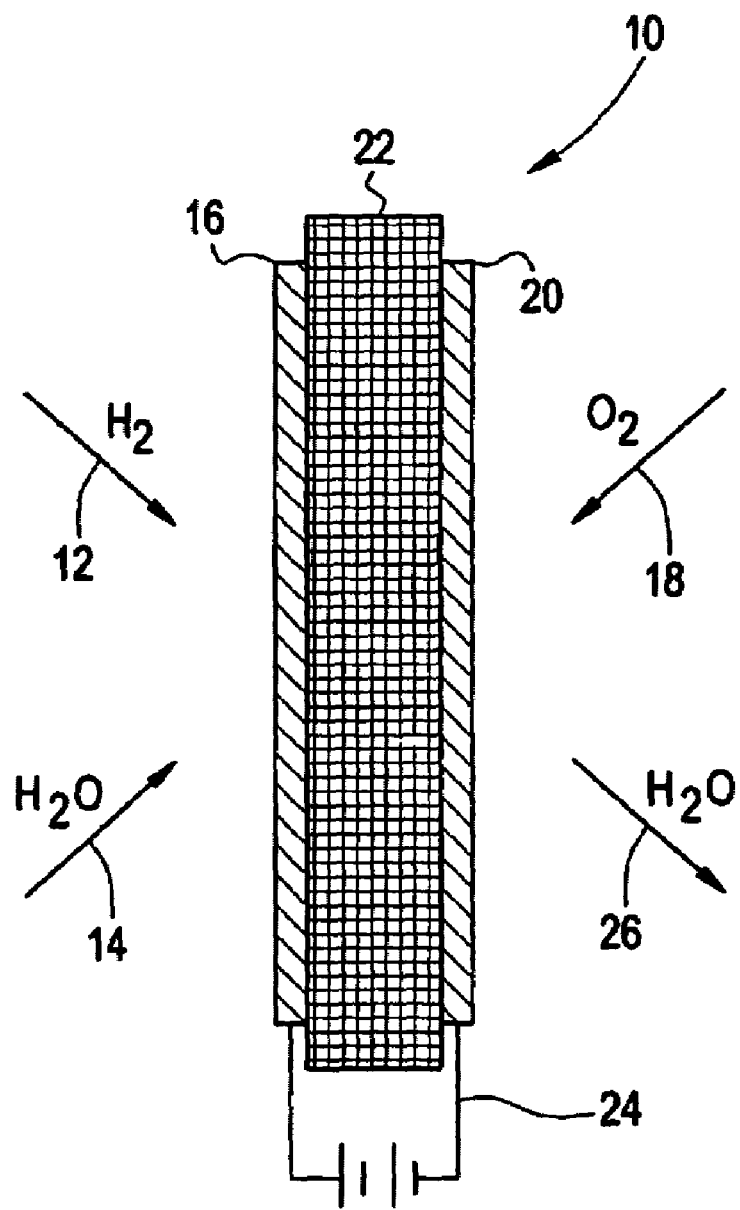
FIG. 1 is a schematic representation of a prior art electrochemical cell showing an electrochemical reaction.
Figure 2:
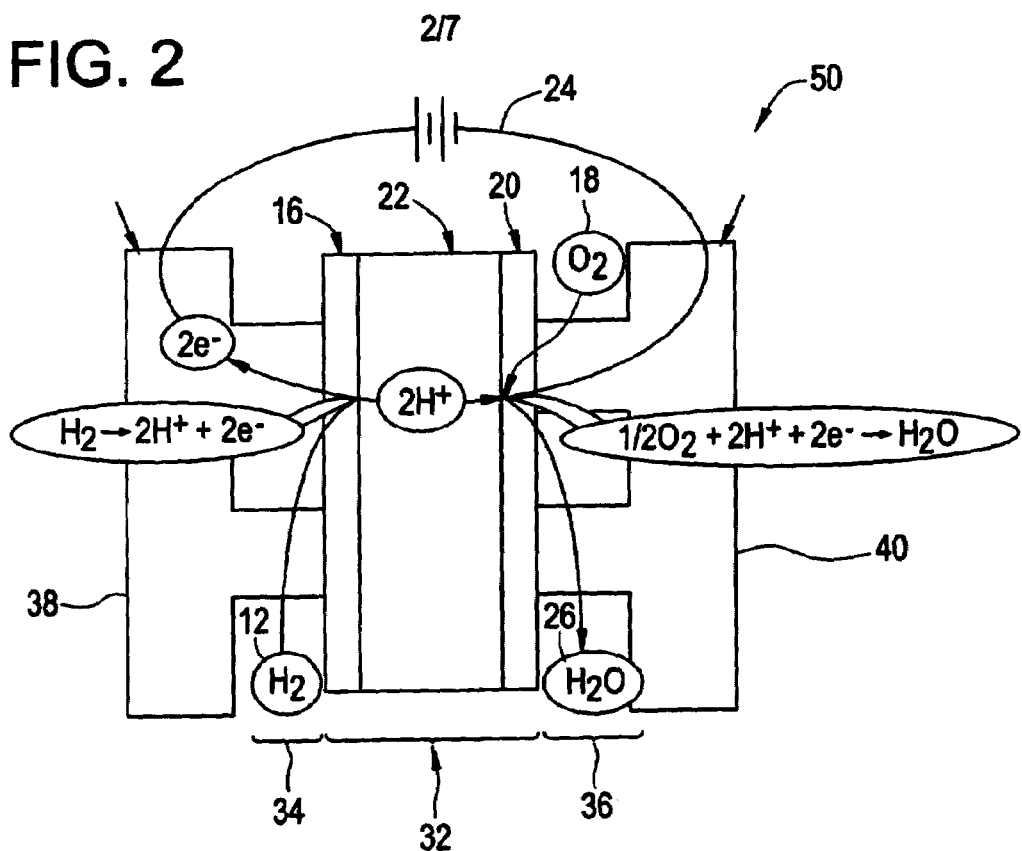
FIG. 2 is a schematic representation of an electrochemical cell operating as a fuel cell.

Referring now to FIG. 2, an exemplary embodiment of a fuel cell is shown at 50. A stack, into which fuel cell 50 is incorporated, preferably includes a plurality of cells employed as part of the cell system. Fuel cell 50 comprises an MEA 32, flow fields 34, 36 disposed at opposing sides of MEA 32, and collector plates 38, 40 respectively disposed in operable communication with flow fields 34, 36. Flow field support structures (not shown) may be disposed at, and preferably within, each flow field 34, 36. Collector plates 38, 40 facilitate the collection of electrical charge within fuel cell 30 and allow for electrical communication to be maintained across MEA 32. An external load 24 is disposed in electrical communication with fuel cell 50 across collector plates 38, 40.

The MEA 32 comprises a proton exchange membrane 22 and electrodes (anode 16 and cathode 20) disposed at opposing sides of proton exchange membrane 22. As shown, both anode 16 and cathode 20 are positioned in ionic communication with proton exchange membrane 22 within the active areas of the cell. The active areas are defined as being the areas of a fuel cell at which hydrogen is dissociated and subsequently combined with an oxygen gas stream to produce water.

Proton exchange membrane 22 can comprise electrolytes that are preferably solids under the operating conditions of the electrochemical cell. Useful materials from which the membrane 22 can be fabricated include proton conducting ionomers and ion exchange resins. Useful proton conducting ionomers include complexes comprising an alkali metal salt, an alkali earth metal salt, a protonic acid, a protonic acid salt, or the like, as well as combinations of the foregoing materials. Counter-ions useful in the above salts include halogen ion, perchloric ion, thiocyanate ion, trifluoromethane sulfonic ion, borofluoric ion, and the like, as well as combinations of the foregoing materials. Representative examples of such salts include, but are not limited to, lithium fluoride, sodium iodide, lithium iodide, lithium perchlorate, sodium thiocyanate, lithium trifluoromethane sulfonate, lithium borofluoride, lithium hexafluorophosphate, phosphoric acid, sulfuric acid, trifluoromethane sulfonic acid, and the like, as well as combinations of the foregoing materials. The alkali metal salt, alkali earth metal salt, protonic acid, or protonic acid salt is complexed with one or more polar polymers such as a polyether, polyester, or polyimide, or with a network or cross-linked polymer containing the above polar polymer or combination of polymers as a segment. Useful polyethers include polyoxyalkylenes, such as polyethylene glycol, polyethylene glycol monoether, and polyethylene glycol diether; copolymers of at least one of these polyethers, such as poly(oxyethylene-co-oxypropylene) glycol, poly (oxyethylene-co-oxypropylene) glycol monoether, and poly(oxyethylene-co-oxypropylene) glycol diether; condensation products of ethylenediamine with the above polyoxyalkylenes; and esters, such as phosphoric acid esters, aliphatic carboxylic acid esters or aromatic carboxylic acid esters of the above polyoxyalkylenes. Copolymers of, e.g., polyethylene glycol with dialkylsiloxanes, maleic anhydride, or polyethylene glycol monoethyl ether with methacrylic acid, are known in the art to exhibit sufficient ionic conductivity to be useful.

Ion-exchange resins useful as proton conducting materials include hydrocarbon- and fluorocarbon-type resins. Hydrocarbon-type ion-exchange resins include phenolic resins, condensation resins such as phenol-formaldehyde, polystyrene, styrene-divinyl benzene copolymers, styrene-butadiene copolymers, styrene-divinylbenzene-vinylchloride terpolymers, and the like, that are imbued with cation-exchange ability by sulfonation, or are imbued with anion-exchange ability by chloromethylation followed by conversion to the corresponding quaternary amine.

Fluorocarbon-type ion-exchange resins can include hydrates of tetrafluoroethylene-perfluorosulfonyl ethoxyvinyl ether or tetrafluoroethylene-hydroxylated (perfluoro vinyl ether) copolymers. When oxidation and/or acid resistance is desirable, for instance, at the cathode of a fuel cell, fluorocarbon-type resins having sulfonic, carboxylic and/or phosphoric acid functionality are preferred. Fluorocarbon-type resins typically exhibit excellent resistance to oxidation by halogen, strong acids, and bases. One family of fluorocarbon-type resins having sulfonic acid group functionality is NAFION® resins (commercially available from E. I. du Pont de Nemours and Company, Wilmington, Del.).

Anode 16 and cathode 20 are fabricated from catalytic materials suitable for performing the needed electrochemical reaction (e.g., the dissociation of hydrogen gas). Suitable catalytic materials for anode 16 and cathode 20 includes, but is not limited to, platinum, palladium, rhodium, carbon, gold, tantalum, tungsten, ruthenium, iridium, osmium, alloys thereof, and the like, as well as combinations of the foregoing materials. Anode 16 and cathode 20 are positioned adjacent to, and preferably in contact with, their respective proton exchange membrane 22 and are defined by structures comprising discrete catalytic particles adsorbed onto a porous substrate. Adsorption of the catalytic particles onto the substrate may be by any method including, but not limited to, spraying, dipping, painting, imbibing, vapor depositing, combinations of the foregoing methods, and the like. Alternately, the catalytic particles may be deposited directly onto opposing sides of proton exchange membranes 22 or onto the support members.

Collector plates 38, 40, preferably comprise foil sheets with a layer disposed between the foil sheets. The layer preferably comprises an integral mixture of conductive particles and elastomeric material. The presence of the integral mixture of conductive particles and elastomeric material between the foil sheets provides a conduction path between the foil sheets. The foil sheets disposed at the opposing sides of the layer of conductive and elastomeric material may comprise single or multiple sheets. The foil sheets can be any material that is electrically conductive, compatible with the electrochemical cell environment, and that maintains sufficient structural integrity to withstand operating conditions of the cell environment. Materials from which the foil sheets can be fabricated include, but are not limited to, metals, metal alloys, and metal superalloys such as iron and iron alloys (e.g., stainless steel and the like), titanium, niobium, nickel and nickel alloys, cobalt and cobalt superalloys, hafnium, zirconium, tungsten, and tantalum, among others, as well as alloys and combinations comprising one of the foregoing materials.

In certain arrangements, the electrochemical cells can be employed as a regenerative system to both convert electricity into hydrogen, and hydrogen back into electricity as needed. In a regenerative system, hydrogen gas can be passively supplied to a cell stack as the hydrogen gas is being consumed, with regulation of the hydrogen gas supply attained via pressure control at the cell inlet. During operation the cell stack is periodically purged to remove inert material or water accumulated at the anode. Alternatively, water can be removed by the recirculation of unconsumed hydrogen gas, via a gas compressor or a diaphragm pump, from the cell stack outlet. In such a mode, the feed to the cell stack is at a stoichiometry of about 1.1 to about 1.2 excess hydrogen. Alternatively, an electrochemical hydrogen compressor can be employed within or external to the cell stack to recirculate hydrogen gas.

An electrochemical hydrogen compressor can have a similar or the same design as the fuel cell, absent the oxygen conduits that are in fluid communication with the fuel cell cathode; e.g., MEA, flow fields, flow field support structures, and the like. In one embodiment, the hydrogen compressor is arranged as part of the cell stack, with a hydrogen compressor disposed every other cell, or every several cells, depending upon the hydrogen recirculation needs. Preferably, the hydrogen compressor is disposed in the cell stack at greater than or equal to every 5 cells (i.e., 5 fuel cells, a hydrogen compressor, 5 fuel cells, a hydrogen compressor . . . ), with greater than or equal to every 8 cells preferred, and greater than or equal to every 10 cells more preferred. The desired amount of hydrogen compressor cells is based upon the desired amount of hydrogen recirculation in combination with the acceptable power loss penalty.

Figure 3:
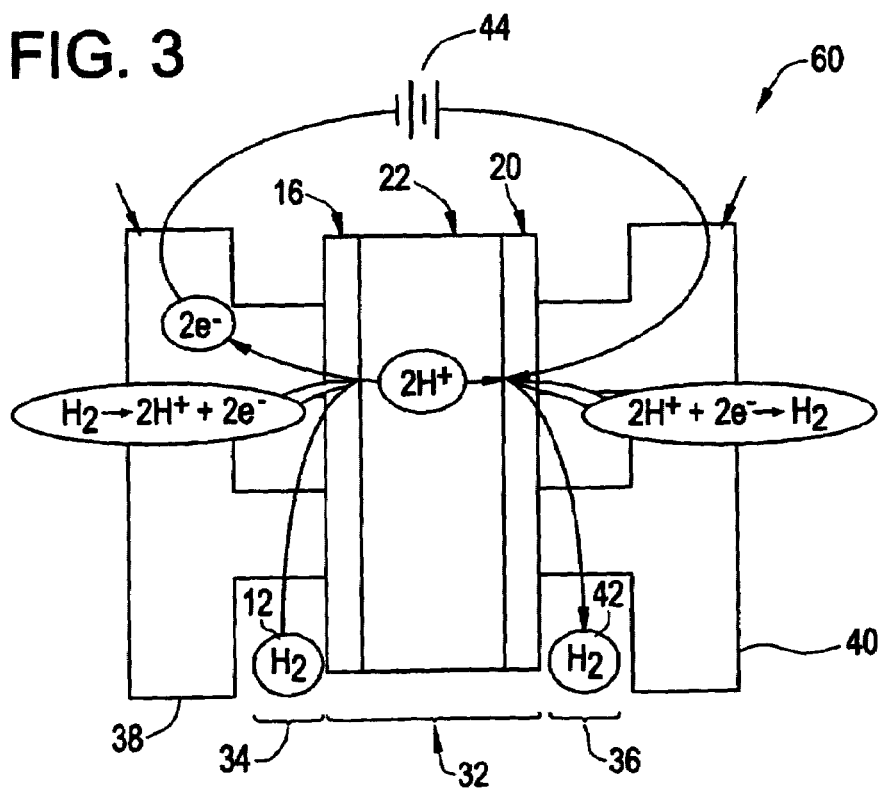
FIG. 3 is a schematic representation of an electrochemical hydrogen compressor.

Operation of compression cell 60 is similar to the operation of the fuel cell, without the introduction of oxygen to the cathode 20. Referring to FIG. 3, a direct current is applied across the proton exchange membrane 22 to "pump" protons therethrough. In particular, upon application of the current across proton exchange membrane 22, hydrogen 12 at the anode 16 ionizes, enabling hydrogen ions (protons) to transfer through the membrane 22 from anode 16 to the cathode 20 while the electrons pass through an external power source 44 to the cathode 20. At cathode 20, the hydrogen ions transferred through proton exchange membrane 22 recombine with the electrons to re-form hydrogen gas 42. Meanwhile, water and inerts exit the flow field 34 via a conduit (not shown) that may be drained or purified and combined with water from the flow field 36.

Figure 4:
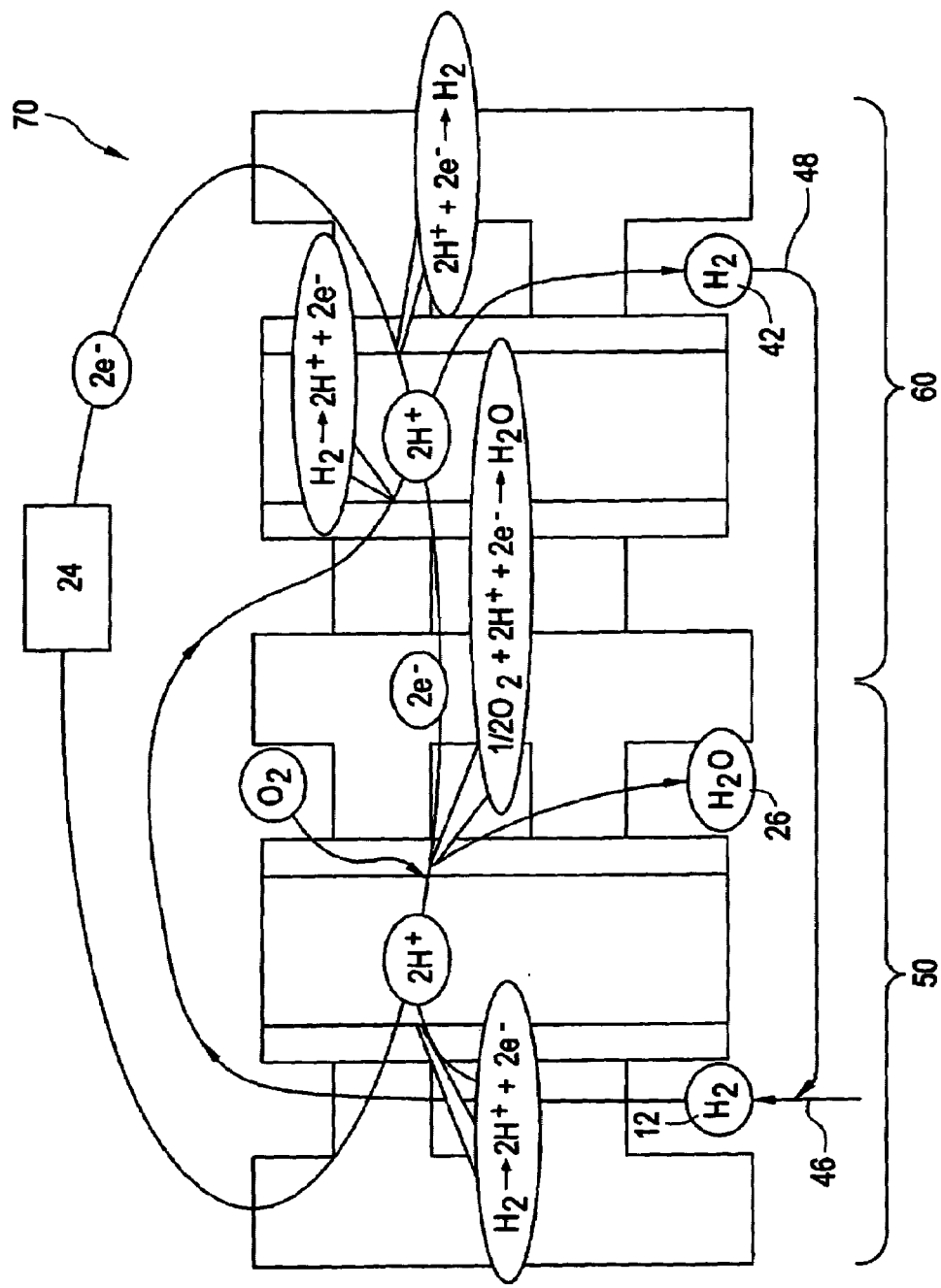
FIG. 4 is a schematic representation of a system comprising a fuel cell and an electrochemical hydrogen compressor.
Figure 5:
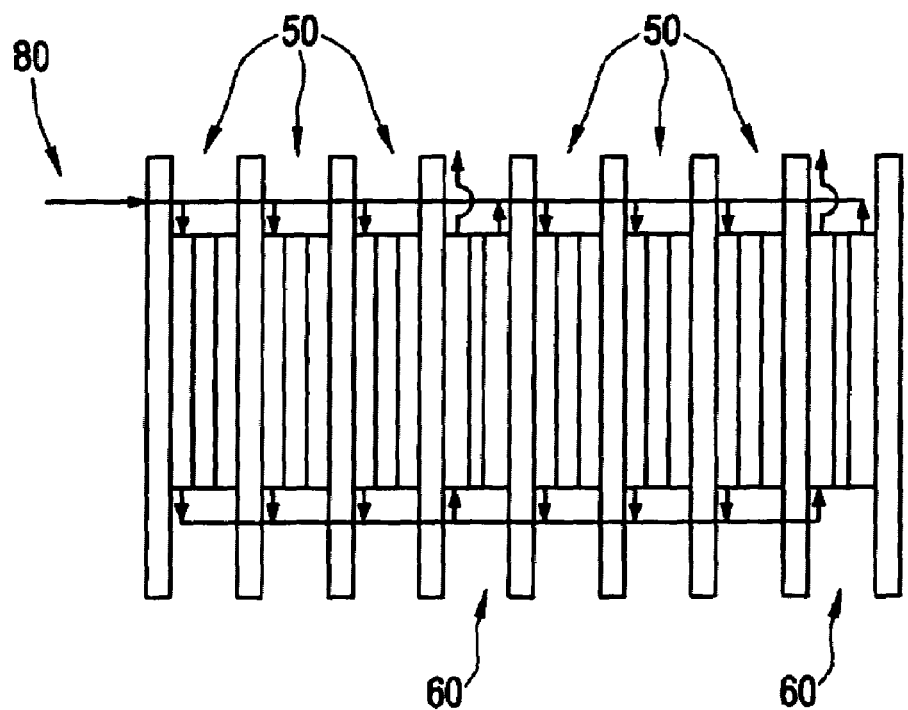
FIG. 5 is a schematic representation of a cell stack in which compression cells are disposed distal from each other within a series of active cells.
Figure 6:
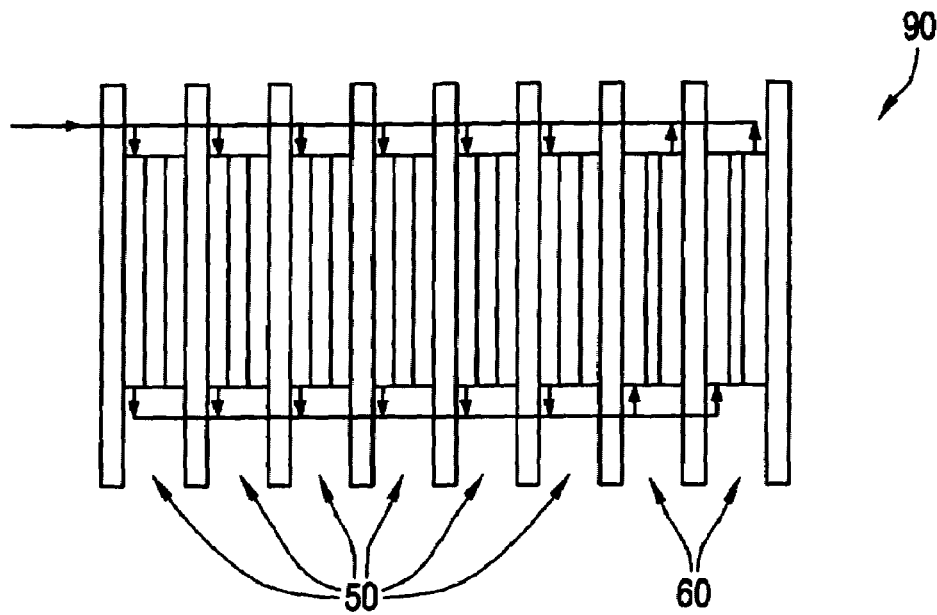
FIG. 6 is a schematic representation of a cell stack in which compression cells are disposed directly adjacent to each other within a series of active cells.

Referring now to FIG. 4, a system, shown generally at 70, comprises a compression cell 60 and a fuel cell 50; hereinafter referred to as "cell/compressor system 70." In cell/compressor system 70 hydrogen gas 12 is introduced at an inlet 46 and converted into electrical energy by fuel cell 50. Excess hydrogen gas (i.e., gas not consumed in fuel cell 50) is directed to the hydrogen compressor (compression cell) 60. Within compression cell 60, the hydrogen ionizes to hydrogen ions and electrons. While the electrons pass through the external load 24, the hydrogen ions migrate across the membrane to recombine with the electrons at the cathode to form compressed hydrogen gas 42. Pumping the hydrogen ions across the membrane enables the hydrogen pressure to be increased from the exit pressure out of the fuel cell(s) 50 to a desired inlet pressure. In other words, the voltage across the membrane in the compression cell 60 causes the migration across the membrane and enables the compression of the excess hydrogen gas entering the compression cell 60.

Figure 10:
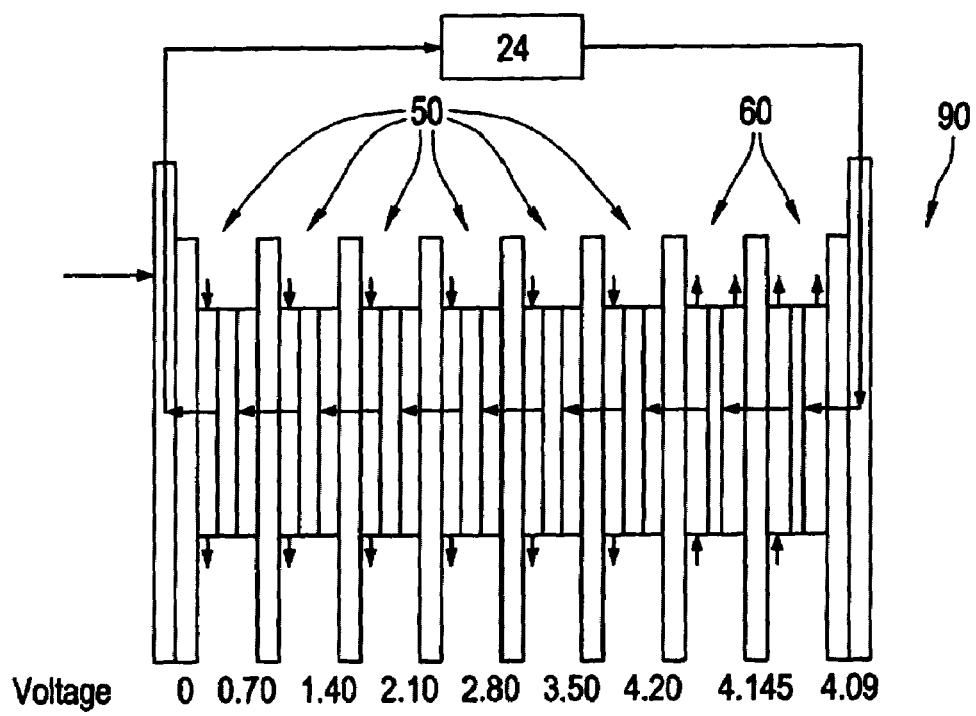
Figure 11:
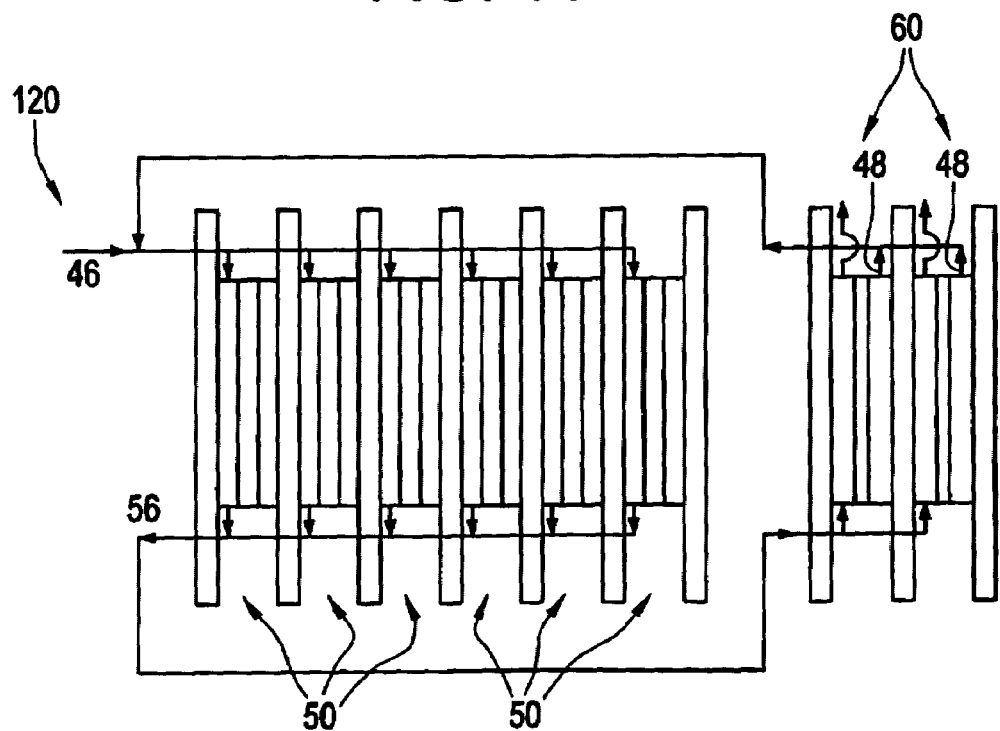
FIG. 11 is a schematic representation of a fuel cell/electrochemical hydrogen compressor system in which the compressor is located remote from the fuel cell.

Compression cell 60 may be incorporated directly into the electrochemical cell stack (e.g., FIGS. 4, 5, 6, 7, 8, and the like), as shown, or it may be disposed external to and remote from the cell stack (e.g., FIG. 11 and the like). Referring now to FIGS. 5–11, one exemplary embodiment of a cell stack in which compression cells 60 are incorporated directly into the cell stack is shown at 80. As shown, cell stack 80 comprises an alternating arrangement of several fuel cells (active cells) 50 followed by a compression cell 60. Although cell stack 80 is shown as having a compression cell 60 disposed at every fourth cell (FIGS. 5, 7, and 9), it should be understood that any number of active cells 50 may be employed prior to one or more compression cell(s) 60. For example, a cell stack can be configured with an alternating arrangement of one or two compression cells 60 disposed between groups of ten active cells 50. It is also noted, although a consistent, alternating arrangement is preferred (e.g., 8 active cells, 2 compression cells, 8 active cells, 2 compression cells . . . ), and inconsistent alternating arrangement can be employed (e.g., 8 active cells, 2 compression cells, 4 active cells, 1 compression cells . . . ).

Figure 7:
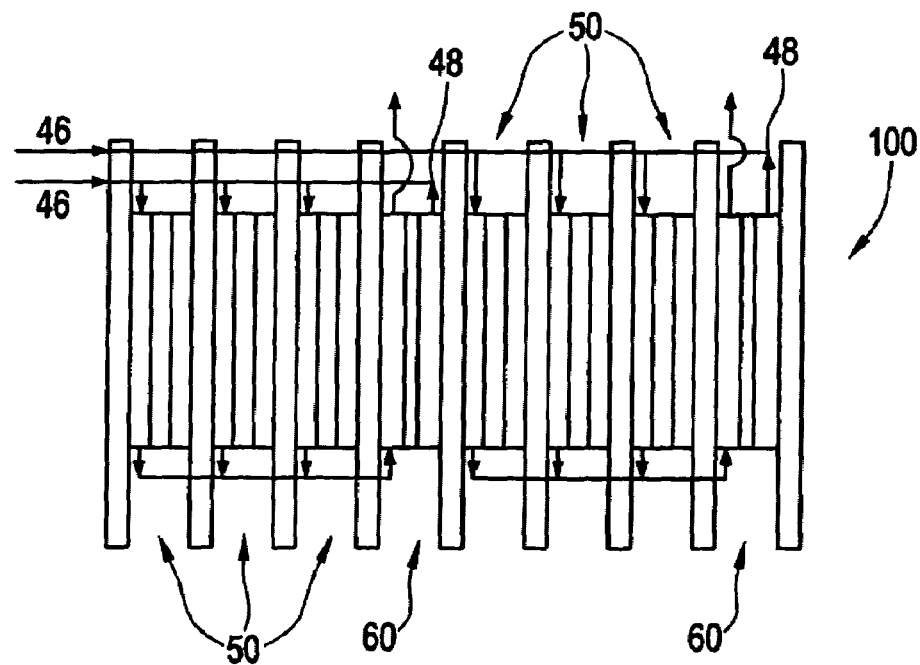
FIG. 7 is a schematic representation of a cell stack in which distinct groups of active- and compression cells include separate inlets.

FIG. 7 illustrates another exemplary embodiment of a cell stack 100 having an integral electrochemical hydrogen compressor. Each group of a specific number of active cells 50 is configured to have respective active cell inlets 46 and compression cell outlets 48 that are not in fluid communication with the active cell inlets and compression cell outlets of adjacently-positioned groups of active cells 50 and compression cells. As such, cell stack 100 may be fed hydrogen from multiple sources, or it may be fed hydrogen from a single source and the hydrogen inlet stream may be split upstream of cell stack 100.

Figure 8:
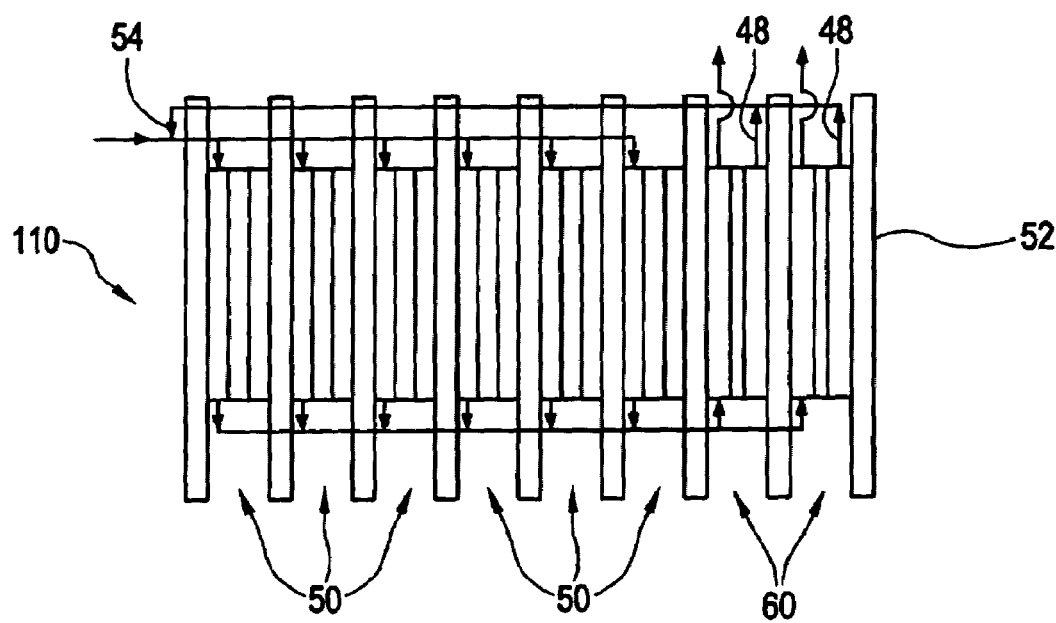
FIG. 8 is a schematic representation of a cell stack in which compression cells are grouped together and manifolded to active cells that are grouped together.

Referring to FIG. 8, another exemplary embodiment of a cell stack having an integral electrochemical compressor is shown at 110. In cell stack 110, compression cells 60 are grouped so as to be directly adjacent to each other at an end plate 52, with the outlets 48 of each compression cell 60 preferably being manifolded and disposed in fluid communication with active cells 50 at a single point 54.

Figure 9:
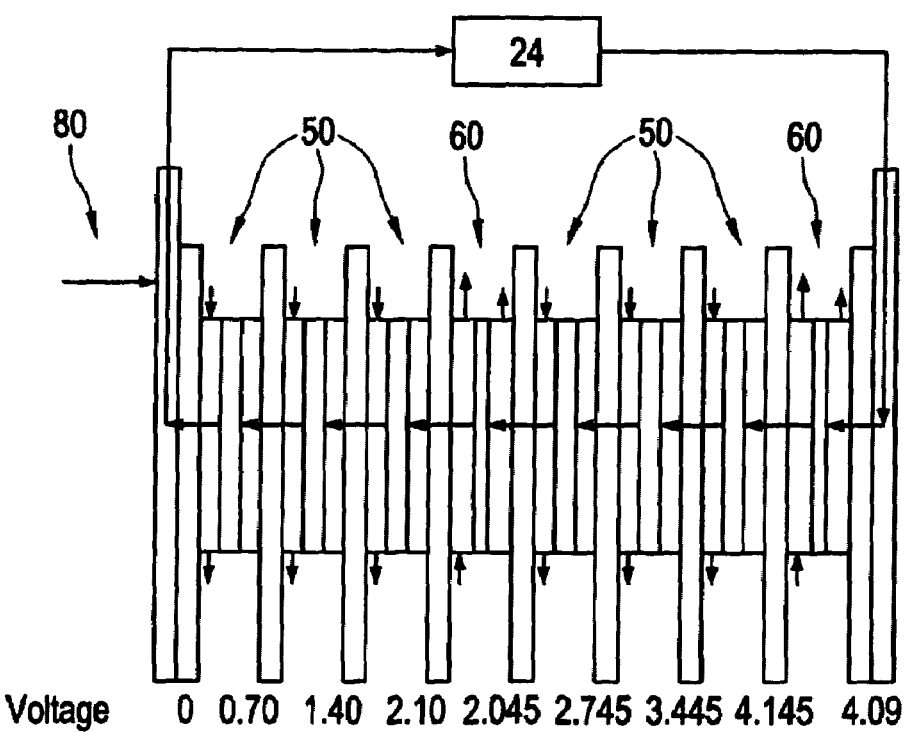
FIGS. 9 and 10 are schematic representations of cell stacks showing voltage distributions.

In cell stack configurations in which the compression cells are positioned distal from each other within the configuration of the cell stack, a cell stack voltage distribution is attained (See FIG. 9). This voltage distribution is similarly applicable to the configuration of cell stack 100 (FIG. 7) since the configuration of inlet hydrogen streams 46 to active cells 50 and outlet hydrogen streams 48 from compression cells 60 has little or no effect on the cell stack voltage distribution. For example, the configuration of inlet hydrogen streams 46 and outlet compression cell streams 48 may be manifolded together (as in FIG. 5) or they may be distinctly grouped (as in FIG. 7). In the structure of the cell stack of FIG. 9 in which a stack of eight cells comprises six active cells 50 and two compression cells 60, the sum of voltage drops (i.e., (2.10–2.045)+(4.145–4.09)) is 0.11 volts (i.e., about 2.6% of the overall cell voltage). In other words, employing the electrochemical hydrogen compressors in FIG. 9 results in an efficiency loss of about 2.6%, while simplifying the system by eliminating mechanical compressors.

In cell stack configurations in which the compression cells are positioned directly adjacent to each other within the cell stack configuration, a cell stack voltage distribution as characterized with reference to FIG. 10 is effected. In the structure of the cell stack of FIG. 10 (which is indicative of the structure of the cell stacks 90 and 110), the sum of voltage drops is also 0.11 volts.

In FIG. 11, one exemplary embodiment of a cell stack 120 in which the electrochemical hydrogen compressor(s) 60 are external to the stack structure is shown. Cell stack 120 comprises a plurality of active cells 50 having hydrogen inlets 46 that are manifolded together and hydrogen outlets 56 that are likewise manifolded together. As above, the inlets 46 are at a higher pressure than the outlets 56 of the active cells 50. In contrast, the compression cell 60 receives the reduced pressure hydrogen from the outlets 56 of the active cells 50, and compresses the hydrogen, releasing, via outlets 48, hydrogen gas having a pressure of greater than or equal to the active cell hydrogen inlet pressure (e.g., at inlet 46).

Essentially, for efficient operation of a fuel cell stack, excess hydrogen is introduced into the stack (i.e., greater than the reaction stoichiometry requires). Consequently, hydrogen gas exits each fuel cell. Discarding the hydrogen reduces stack efficiency (e.g., for a 1.2 stoichiometry, an efficiency loss of greater than about 15% is realized). Recirculation of the hydrogen using a mechanical compressor is more efficient than discarding the hydrogen, but is still inefficient, and employs moving parts.

In contrast to discarding the hydrogen or recycling the hydrogen using a mechanical compressor, the electrochemical compressor recycles substantially all of the hydrogen while improving the system efficiency over the mechanical compressor. Additionally, a mechanical compressor is not really useful when hydrogen is supplied in a mixture of gases (e.g., from a reformate exhausted from a fuel processing apparatus). When supplied as a reformate (e.g., reformer effluent), recirculation of the exhausted gas may result in the lowering of the hydrogen concentration at the cell stack inlet, which in turn may result in the loss in voltage across the cell stack and decreased power and efficiency. Electrochemical compression as described herein, however, allows for the recirculation of the hydrogen constituent of a reformate gas while not recirculating the other gases of the reformate. Thus, the electrochemical compressor can even be employed in the recirculation of a reformate. Consequently, the electrochemical hydrogen compressor can be used to filter reformate, (e.g., separate the hydrogen from the byproducts in the reformate), and direct the filtered hydrogen to a fuel cell, and/or can be used to compress and/or filter the excess hydrogen stream from the fuel cell. When used to filter the reformate, the electrochemical hydrogen compressor is fluidly located between a reformer and a fuel cell stack such that reformate would pass through the electrochemical hydrogen compressor prior to entering the fuel cell stack. This electrochemical hydrogen compressor can be the same or a different electrochemical hydrogen compressor than is used to compress the excess hydrogen and recirculate it to the fuel cell stack. By filtering reformate, fuel cell efficiency will improve over a cell operating on a reformate stream (e.g., by eliminating the loss of voltage due to dilution of the hydrogen gas).

The above-described electrochemical hydrogen compressor and its exemplary embodiments provide for the operation of a fuel cell stack in which hydrogen gas is recirculated back to the inlet of the cell stack. The system can employ a direct current across a proton exchange membrane to pump hydrogen from a lower pressure to a higher pressure, thus providing for improved cell performance without the loss of hydrogen. Furthermore, because the power consumption of the electrochemical compression system is low compared to other devices that achieve the same or similar results, the efficiency penalty is small. Electrochemically recirculating the hydrogen gas places little power drain on the electrochemical system, with a minimum amount of noise, (e.g., versus a mechanical compressor), while allowing water and inerts to be removed from the cell stack.

Moreover, the electrochemical hydrogen compressor may be operated without pressure regulation that is additional to the regulation of the cell stack inlet pressure. Because the higher pressure chamber of the electrochemical hydrogen compressor is disposed in fluid communication with the cell stack inlet, the pressure at the compressor outlet is determined by the pressure at the cell stack inlet, i.e., the desired system pressure. Thus, while each of the cells of the cell stack operate at a pre-selected stoichiometry with the excess flow being provided by the electrochemical hydrogen compressor, hydrogen flow of the system itself is self-regulating. As such, for pressure fluctuations at the cell stack inlet, the compressor output is corresponding altered, thereby causing the recirculation rate through the cell stack to be steady.

Other notable advantages of the electrochemical compressor include improved reliability of the system due to the lack of mechanical parts, and the ability of the device to provide for the separation of hydrogen gas from other gases in a reformate. Actually, the electrochemical hydrogen compressor can be located within (as part of) the fuel cell stack, thereby reducing space and simplifying the system.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the disclosure without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electrochemical cell system comprising:
    a fuel cell stack comprising a fuel cell having a fuel cell hydrogen inlet and a fuel cell hydrogen outlet; and
    a first electrochemical hydrogen compressor in fluid communication with the fuel cell hydrogen outlet, wherein the first electrochemical hydrogen compressor comprises electrodes in electrical communication with an electricity source, and a compressed hydrogen outlet in fluid communication with the fuel cell hydrogen inlet;
    wherein the first electrochemical hydrogen compressor is disposed in the fuel cell stack and between a group of fuel cells.

2. The electrochemical cell system of claim 1, further comprising a second electrochemical hydrogen compressor disposed in the fuel cell stack, wherein the first electrochemical hydrogen compressor and the second electrochemical hydrogen compressor are disposed in an alternating relationship with fuel cells in the fuel cell stack.

3. The electrochemical cell system of claim 1, wherein the first electrochemical hydrogen compressor is capable of separating hydrogen from other gases.

4. An electrochemical cell system comprising:
    a fuel cell stack comprising a fuel cell having a fuel cell hydrogen inlet and a fuel cell hydrogen outlet; and
    a first electrochemical hydrogen compressor in fluid communication with the fuel cell hydrogen outlet, wherein the first electrochemical hydrogen compressor comprises electrodes in electrical communication with an electricity source, and a compressed hydrogen outlet in fluid communication with the fuel cell hydrogen inlet, and disposing
    a second electrochemical hydrogen compressor disposed adjacent to the first electrochemical hydrogen compressor.

5. The electrochemical cell system of claim 4, wherein the an electricity source further comprises a direct current power source.

6. The electrochemical cell system of claim 5, wherein the direct current power source is the fuel cell.

7. An electrochemical cell system, comprising:
    a fuel cell stack comprising a fuel cell having a fuel cell hydrogen inlet and a fuel cell hydrogen outlet;
    a reformer having a fuel inlet and a hydrogen and byproduct outlet; and
    a first electrochemical hydrogen compressor comprises electrodes in electrical communication with an electricity source and a compressed hydrogen outlet in fluid communication with the fuel cell hydrogen inlet, wherein the electrochemical hydrogen compressor is fluidly disposed between the fuel cell stack and the reformer, in fluid communication with the hydrogen and byproduct outlet and the fuel cell hydrogen inlet; and
    a fuel cell in fluid communication with the hydrogen electrode.

8. The electrochemical cell system of claim 7, further comprises a third electrochemical hydrogen compressor fluidly disposed between the fuel cell stack and the reformer, in fluid communication with the hydrogen and byproduct outlet and the fuel cell hydrogen inlet, and wherein at least the first hydrogen compressor is disposed within the fuel cell stack.

9. The electrochemical cell system of claim 8, wherein the fuel cell is the electrical source for the third electrochemical compressor.

10. The electrochemical cell system of claim 7, wherein the fuel cell is the electricity source.

11. A method of operating an electrochemical cell system further comprising:
    reforming a fuel to produce reformate comprising hydrogen and byproducts;
    introducing the reformate to the first electrochemical hydrogen compressor;
    separating the hydrogen from the byproducts in the electrochemical compressor, to form a hydrogen feed; and
    introducing the hydrogen feed to a fuel cell at a feed rate of greater than stoichiometry;
    directing excess hydrogen from the fuel cell to a first electrochemical hydrogen compressor;
    electrochemically compressing the excess hydrogen to compressed hydrogen; and
    recirculating the compressed hydrogen gas to the fuel cell.

12. A method of operating an electrochemical cell system further comprising:
    introducing hydrogen feed to a fuel cell at a feed rate of greater than stoichiometry;
    directing excess hydrogen from the fuel cell to a first electrochemical hydrogen compressor;
    electrochemically comprising the excess hydrogen to compressed hydrogen;
    reforming a fuel to produce reformate comprising hydrogen and byproducts;
    introducing the reformate to a second electrochemical hydrogen compressor; and
    separating the hydrogen from the byproducts in the second electrochemical hydrogen compressor to form the hydrogen feed;
    introducing the separated hydrogen to the fuel cell.

13. The method of claim 12, further comprising recirculating the compressed hydrogen gas to the fuel cell.

14. A method of operating an electrochemical cell system, comprising:
    reforming a fuel to produce reformate comprising hydrogen and byproducts;
    introducing the reformate to an electrochemical hydrogen compressor;
    separating the hydrogen from the byproducts in the electrochemical compressor; and
    introducing the separated hydrogen to a fuel cell.

15. The method of claim 14, further comprising applying a direct current to the electrochemical hydrogen compressor.

* * * * *